Oct. 18, 1932.  J. J. GLAUSER  1,882,660
PROCESS FOR THE CONTINUOUS MANUFACTURE OF
ICE CREAM AND SIMILAR FROZEN PRODUCTS
Filed Feb. 13, 1929  3 Sheets-Sheet 1

Fig. 1

INVENTOR

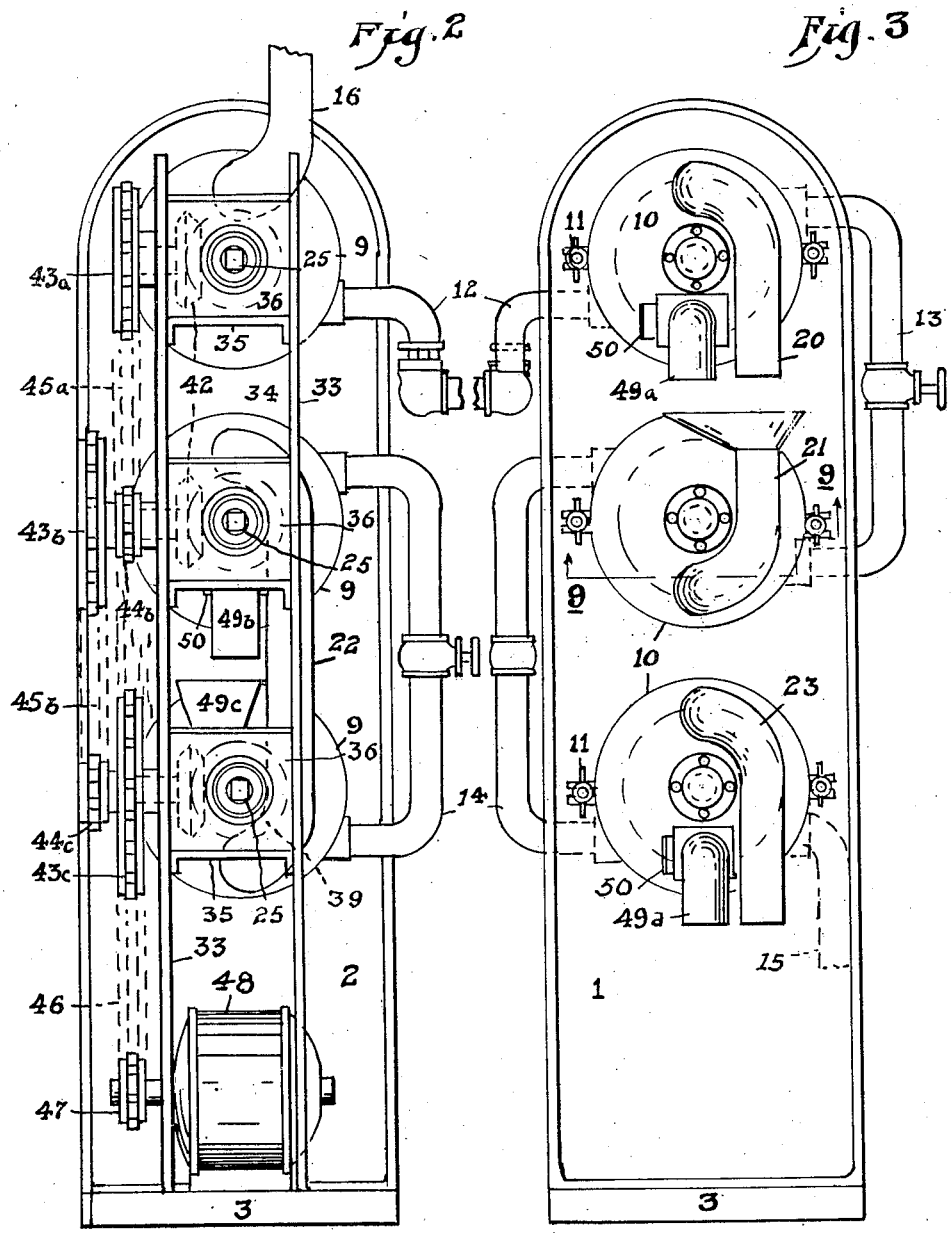

Oct. 18, 1932.    J. J. GLAUSER    1,882,660
PROCESS FOR THE CONTINUOUS MANUFACTURE OF
ICE CREAM AND SIMILAR FROZEN PRODUCTS
Filed Feb. 13, 1929    3 Sheets-Sheet 3
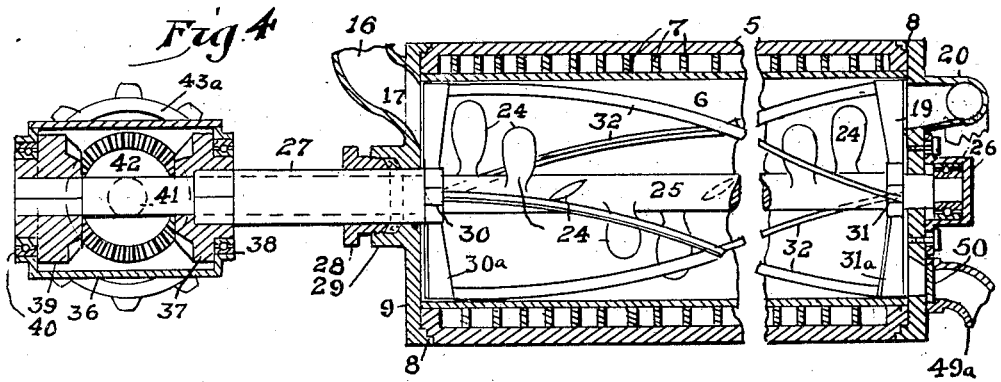
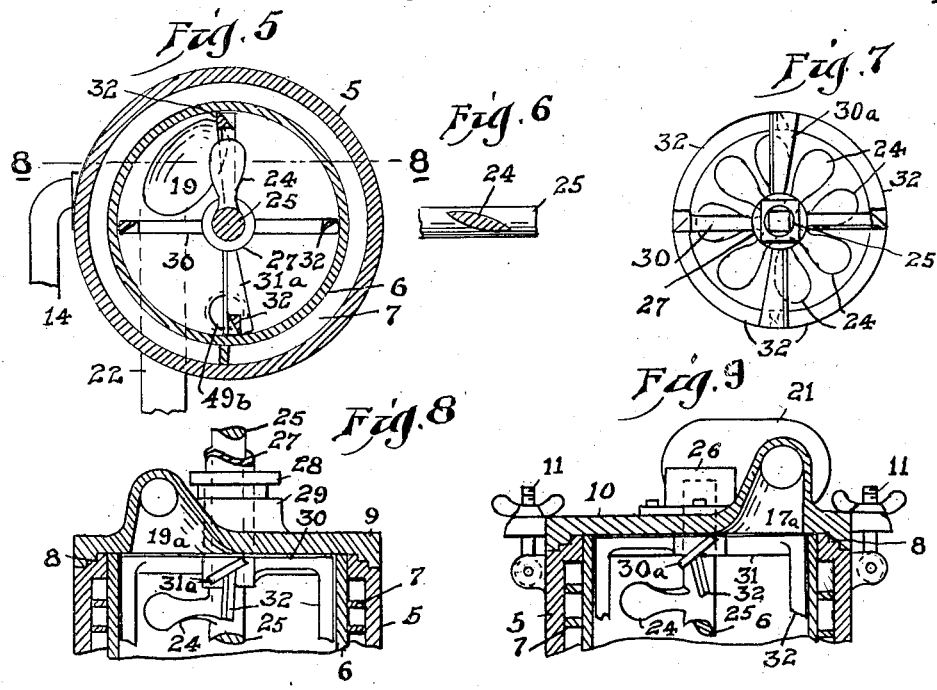
INVENTOR
John J. Glauser
by Edward A. Lawrence
his attorney Patented Oct. 18, 1932

1,882,660

UNITED STATES PATENT OFFICE

JOHN J. GLAUSER, OF PITTSBURGH, PENNSYLVANIA

PROCESS FOR THE CONTINUOUS MANUFACTURE OF ICE CREAM AND SIMILAR FROZEN PRODUCTS

Application filed February 13, 1929. Serial No. 339,573.

The object which I have in view is the continuous manufacture of ice cream and the like for the purpose of effecting substantial savings in time and also in labor costs, and also the production of a greatly improved grade of product.

The material consisting of flavored cream or other liquid is caused to pass through a plurality of compartments wherein it is subjected to refrigeration, as for instance with brine or liquid ammonia, and is agitated, the agitation or beating being at first at a relatively slow rate to prevent the formation of butter from the cream, but the speed of agitation being progressively increased as the process of solidification proceeds.

The material is discharged from the last compartment of the machine in semi-solidified state, sufficiently fluid to permit its conveyance, into cans which are then placed in the hardening room for complete solidification before the product is ready for use.

For the accomplishment of my process I have invented a new and improved apparatus which comprises a plurality of horizontally disposed cylinders connected in series and preferably in superimposed relation, the cylinders being subjected to refrigeration as by means of brine circulating about their walls.

The material, such as the flavored cream is first introduced into the uppermost cylinder and is conveyed in turn through the other cylinders, being discharged from the lowermost cylinder employed.

I provide novel means for beating the material in the cylinders and for conveying it through the cylinders, the beating and conveying being at a relatively slow speed at first and progressing in speed from the inlet to the outlet of the machine.

Other novel features of construction and of arrangement of parts will appear from the following description.

In the accompanying drawings, wherein I have illustrated a practical embodiment of the principles of my invention, Fig. 1 is a front elevation of the machine.

Fig. 2 is an end elevation of the same looking from the left in Fig. 1 and illustrating the paddle-conveyer drive.

Fig. 3 is the opposite end elevation of the machine.

Fig. 4 is a longitudinal section of the uppermost cylinder showing the paddle-conveyer mechanism and the drive.

Fig. 5 is a sectional view taken along the line 5—5 in Fig. 1.

Fig. 6 is a detail showing one of the paddles and its shaft.

Fig. 7 is an end view of the paddle-conveyer mechanism shown dismounted.

Fig. 8 is a detail view in section along the line 8—8 in Fig. 5, showing the outlet for the intermediate cylinder.

Fig. 9 is a detail in section along the line 9—9 in Fig. 3, showing the inlet of the intermediate cylinder.

Referring to the drawings, 1 and 2 represent a pair of vertically disposed stands rising from a base 3 to which they are rigidly connected.

Said stands are provided with circular openings which are alined in pairs so that a plurality of horizontally disposed cylinders indicated at 4a, 4b and 4c as three in number may be supported in position by their extension through said openings.

Said cylinders comprise an outer cylindrical wall 5 and spaced inwardly therefrom an inner cylindrical wall 6, and provision is made for the circulation of a refrigerating fluid or liquid between said walls.

Thus I have shown a helical partition 7 interposed between the concentric walls 5 and 6.

The ends of the space between the outer and inner walls may be closed by the internal flanges 8 of the outer wall. The ends of the cylinder are closed by the heads 9 and 10, respectively, which heads may be secured in place, as by the swing bolts 11.

The materials used for the cylinder walls, the helical partitions and heads should be a metal or other material not subject to corrosion or rust.

A pipe 12 leading from a supply of brine or other refrigerant connects to one end of the helical passage between the walls of the upper cylinder 4a and the other end of said passage is connected by a pipe 13 to the corresponding end of the helical refrigerant passage of the intermediate cylinder 4b. The other end of said passage is connected by a pipe 14 to the corresponding end of the helical passage of the lowermost cylinder and the other end of said passage is connected by the return pipe 15 to the refrigerant supply. Thus a continuous current or circulation of refrigerant is maintained within the double walls of the cylinders.

The temperature maintained in the cylinders is preferably from about zero Fahr. to seven degrees below zero.

16 represents a supply pipe leading into one end of the uppermost cylinder 4a. Said pipe connects to an inwardly flaring port 17, similar to the port 17a in Fig. 9.

The pipe 16 may connect to a mixing tank for the cream or other material to be worked, and it may be provided with a valve 18 to shut off or control the rate of flow.

The outlet for the cylinder 4a is at its opposite end and is in the form of an outwardly tapering port 19, similar to the port 19a in Fig. 8. Said port 19 has connected thereto the pipe 20 whose lower end is positioned above the funnel-like upper end of a pipe 21 whose lower end is connected to the port 17a, Fig. 9, in the head 10 of the cylinder 4b. This port is preferably below the center of the head.

Above the center of the head 9 of the cylinder 4b is an outlet port shown at 19a in Fig. 8, which is connected by a pipe 22 to a port, similar to the port 17a in Fig. 9 in the head 9 of the cylinder 4c.

Above the center of the head 10 of the cylinder 4c a depending discharge pipe 23 is connected to a port in said head similar to the port 19a in Fig. 8.

The product discharged from the pipe 23 is received into cans or other containers or receptacles and stored in the usual hardening room.

It will be seen that the travel of the material is from left to right in cylinder 4a, from right to left in cylinder 4b, and from left to right in cylinder 4c.

I provide means for both agitating the material in the cylinders and for conveying it through the cylinders.

Thus I employ in each of the cylinders paddles mounted on a shaft disposed axially of the cylinder, said paddles being provided with the proper inclination to the plane of the axis of rotation to produce a conveying effect, and working next to the interior wall of the cylinder I provide a plurality of helical blades revolving in the opposite direction to the paddles.

In Fig. 1 I have indicated the paddles and their shaft in dotted lines in connection with the intermediate cylinder 4b and the helical blades by dotted lines in connection with the top cylinder 4a.

The paddles 24, which are preferably provided with knife impact edges, are mounted on an axial shaft 25 whose one end is journaled in a ball bearing carried by a box 26 which is bolted over a central aperture in the head 10 of the cylinder. The bolt holes in the box are slotted so that the shaft may be properly centered relative to the cylinder The other end of the shaft 25 is nested in a tubular sleeve 27 which extends inwardly through a gland 28 in the head 9 and is journaled in a bearing 29 in the center of the said head 9 of the cylinder.

The end of the sleeve 27 has mounted thereon within the cylinder and adjacent to the cylinder head 9 a hub provided with radial arms indicated at 30, and a similar hub with radial arms 31 is rotatably mounted on the shaft 25 just within the cylinder head 10.

Spanning the space between the pairs of arms 30 and 31 are the helically disposed blades 32 whose outer edges are knife edges which work close to the inner wall of the cylinder, the paddles 24 being short enough to clear the helical blades 32.

Erected on the base 2 are the twin stands 33 provided with vertically slotted openings 34.

35 represents bridge pieces or shelves connecting the stands 33 and on said shelves are mounted the housing boxes 36, one for each cylinder.

The sleeve 27 of each cylinder extends into the housing 36 and has its end provided with a bevelled gear 37 whose hub is journaled in a bearing 38, preferably a ball bearing in the wall of the housing. The shaft 25 is prolonged through the housing and is provided with a bevelled gear 39 opposed to the gear 37 whose hub is journaled in a bearing 40 in the opposite wall of the housing.

41 represents a shaft disposed at right angles to the shaft 25 and journaled in a sleeve bearing in a third wall of the housing.

The inner end of the shaft 41 is provided with a bevelled pinion 42 in mesh with the pinions 37 and 39.

Each of the three shafts 41 have mounted on their outer ends a sprocket, shown at 43a, 43b and 43c respectively.

The intermediate shaft 41 is also provided with a small sprocket 44b while the lowermost shaft 41 is provided with a small sprocket 44c.

The sprockets 43a and 44b are connected by a chain 45a. The sprockets 43b and 44c are connected by a chain 45b. The sprocket 43c is connected by a chain 46 with the driving sprocket 47 of a variable speed motor 48 which may be mounted on the bed 3.

The diameters of the sprockets are so graduated that speed of the paddles and blades are increased from top to bottom of the machine, those of the top cylinder preferably revolving at about 400 R. P. M.; those of the intermediate cylinder at about 500 R. P. M., and those of the bottom cylinder at about 600 R. P. M.

It will be noted that because of the provision of the sets of opposed gears 37 and 39, the shaft 25 and its paddles 24 will be revolved in the opposite direction to that of the helical blades in the same cylinder, the paddles and blades having opposite pitches so that both will have a conveying action on the material from the inlet to the outlet of the cylinder.

Also the paddles and helical blades in the intermediate cylinder have reverse pitches to those of the paddles and blades in the top and bottom cylinders so that the material will be conveyed from right to left in the intermediate cylinder instead of from left to right.

One or more of the radial arms 30 at the intake end of a cylinder, which work past the inlet port in the cylinder head, are given a sharp angle, as illustrated at 30a in Fig. 9 to act as an impeller to draw the material into the cylinder, and likewise one or more of the radial arms working past the outlet port are turned as at 31a in Fig. 8 to act as an expeller.

Below its center the head 10 of the top cylinder 4a is provided with a drain port to which is connected a depending drain pipe 49a. The lower portion of the head 9 of the cylinder 4b is also provided with a drain port which is connected to a depending pipe 49b whose lower end is positioned above the funnel-like upper end of a pipe 49c whose lower end is connected to a port in the adjacent end 9 of the cylinder 4c. The lower portion of the head 10 of the cylinder 4c is provided with a drain port which is connected to the drain pipe 49d. Each of said pipes is provided adjacent to its inlet end with a gate or closure 50.

In operation, the cream or other fluid material, preferably at a temperature of not more than 40° Fahr., is admitted to the top cylinder 4a through the supply pipe 16, the rate of flow being regulated by means of the valve 18.

The speed of movement of the agitating and conveying means operating in the cylinder 4a is so regulated that the cream is not churned into butter but the process of solidification is such that the crystals are broken up and the material as it leaves the top cylinder and enters the intermediate cylinder is smooth and uniform in consistency.

The material flows from the cylinder 4a through the pipe 20 and across the gap into the pipe 21, the consistency and the condition of the material being thus exposed to observation. The gap between the pipes 20 and 21 also permits the entrance of air which is required to puff up the cream and prevent it becoming too dense and heavy when fully frozen. The open upper end of the pipe 49c provides an air-inlet for the bottom cylinder 4c, thus providing the requisite supply of air to the bottom cylinder.

During its passage through the intermediate cylinder, the material is agitated at a greater speed, as the danger of butter formation is much lessened, and the material when it passes from the intermediate cylinder 4b into the bottom cylinder 4c is in a semi-solid state.

In the bottom cylinder the agitation of the material is accomplished at a still greater speed, thus resulting in a very light and finely grained product which leaves the bottom cylinder in an almost solid condition, just about fluid enough to enable it to be conveyed by the paddles and helical blades.

The material is received from the bottom cylinder into cans or other receptacles or containers and removed to the hardening room.

When a run of the machine has been completed, the gates 50 are opened and the remaining material allowed to drain out of the cylinders which are then scalded out with hot water, the paddles and blades being meanwhile rotated.

With the use of my improved process and apparatus a greatly increased output is made practical and but one operator is required. The product is of much smoother and more even texture than has hitherto been possible.

What I desire to claim is:—

1. The process of manufacturing ice cream and the like which consists in causing a continuous flow of the mass of material, agitating the mass during the first portion of said flow at a predetermined rate while subjecting the same to refrigeration, and agitating said material thereafter at a higher rate but below the butter forming rate while still subjecting it to refrigeration.

2. The process of manufacturing ice cream and the like which consists in causing a continuous flow of the mass of the material, agitating the mass during the first portion of the flow at a predetermined rate below the butter forming rate while subjecting the same to refrigeration, and agitating the material thereafter without interruption of the continuous flow at a higher rate but still below the butter forming rate while still subjecting it to refrigeration.

3. That process of manufacturing ice cream and the like which consists in causing a continuous flow of the mass of material along a predetermined path, agitating the flowing material at various points throughout said path, while maintaining the agitation below the butter forming rate, said agitation of the flowing material at certain points in its path being increased but still below the butter forming rate, and chilling the material at each point of agitation.

4. That process of manufacturing ice cream and the like which consists in causing a continuous flow of the mass of material along a predetermined path, agitating the flowing material at various points throughout said path while maintaining the agitation below the butter forming rate, said agitation of the flowing material at the later points in its path being increased, but still below the butter forming rate, chilling the material at each point of agitation, and admitting air to the material between successive agitation points.

Signed at Pittsburgh, Pa., this 12th day of Feby., 1929.

JOHN J. GLAUSER.